(12) United States Patent
Mikleton et al.

(10) Patent No.: US 8,031,856 B2
(45) Date of Patent: *Oct. 4, 2011

(54) CUSTOMER OWNED TELEPHONE NUMBERS

(75) Inventors: Christopher W. Mikleton, Denver, CO (US); Dena M. Hunter, Littleton, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 1125 days.

This patent is subject to a terminal disclaimer.

(21) Appl. No.: 11/319,918

(22) Filed: Dec. 27, 2005

(65) Prior Publication Data

US 2007/0147358 A1   Jun. 28, 2007

(51) Int. Cl.
*H04M 7/00* (2006.01)
(52) U.S. Cl. ............ 379/219; 379/220.01; 370/352
(58) Field of Classification Search .......... 370/352, 370/356; 379/219, 220.01
See application file for complete search history.

(56) References Cited

U.S. PATENT DOCUMENTS

| | | | |
|---|---|---|---|
| 6,021,126 A | 2/2000 | White et al. | |
| 6,078,657 A * | 6/2000 | Alfieri et al. | 379/220.01 |
| 6,160,880 A * | 12/2000 | Allen | 379/221.13 |
| 7,088,677 B1 * | 8/2006 | Burst, Jr. | 370/229 |
| 7,307,985 B1 * | 12/2007 | Fallis et al. | 370/357 |
| 2002/0114274 A1 * | 8/2002 | Sturges et al. | 370/229 |
| 2005/0041795 A1 | 2/2005 | Goldstein et al. | |
| 2005/0053213 A1 | 3/2005 | Giannoit | |
| 2005/0111640 A1 * | 5/2005 | Moisey et al. | 379/114.2 |
| 2005/0190721 A1 | 9/2005 | Pershan | |
| 2005/0281399 A1 | 12/2005 | Moisey et al. | |
| 2006/0245573 A1 * | 11/2006 | Sheth et al. | 379/221.13 |
| 2007/0258442 A1 | 11/2007 | Mikleton | |

FOREIGN PATENT DOCUMENTS

WO   2005109798 A2   11/2005

OTHER PUBLICATIONS

International Search Report, U.S. Patent and Trademark Office as Receiving Office, International Search Report (Form PCT/ISA/210) for international application No. PCT/US2006/42747, Apr. 27, 2007, 2 pages.

* cited by examiner

*Primary Examiner* — Ahmad Matar
*Assistant Examiner* — Oleg Asanbayev

(57) ABSTRACT

According to various embodiments of the present invention, systems and methods for routing telephone calls from host switch to remote switch in a Voice Over Internet Protocol ("VoIP") network. A host switch in the VoIP network may be communicably coupled with a plurality of remote switches and with a public switched telephone network ("PSTN"); the host switch may receive a call from PSTN having signaling that includes a called party number field and/or a location routing number field. Based on the called party number field and/or the location routing number field, host switch identifies a target remote switch from among the plurality of remote switches that is associated with the called party number field by, for example, querying a database of associations between location routing numbers and/or telephone numbers and remote switches. Host switch then sends the call to identified target remote switch.

17 Claims, 5 Drawing Sheets

CUSTOMER OWNED TELEPHONE NUMBERS

BACKGROUND OF THE INVENTION

One or more embodiments of the present invention are related to systems and methods for placing media communications through a network, and more particularly to systems and methods for routing voice over internet protocol ("VoIP") calls to and from a customer owned remote switch.

Providers of VoIP networks currently must directly administrate the addition, deletion, and modification of telephone numbers associated a subscriber, in order to ensure that calls passing through the VoIP networks reach their intended destination subscribers. In other words, when a potential customer approaches VoIP network owners and expresses an interest in offering telephone service to subscribers through the VoIP network, the customer must often obtain a telephone number for each subscriber by allocation from the VoIP network owner. Such processes may increase cost and time, for the VoIP network owner and/or the customer, associated with adding new subscribers and managing a portfolio of subscribers and/or customers.

Additionally, customers of VoIP network owners may currently be limited in their ability to perform services such as local number portability, emergency call completion, caller ID with name database functions, line information database functions, and other telephone number related functions, except by relying on the VoIP network owner to provide such services. In such scenarios, cost and time may be increased due to the often necessary interaction between VoIP network owner and customer to add and make changes to the services of a particular subscriber.

Hence, for at least these reasons, there exists a need in the art for advanced systems and methods for routing calls associated with customer owned telephone numbers.

BRIEF SUMMARY OF THE INVENTION

One or more embodiments of the present invention are related to systems and methods for placing media communications through a network, and more particularly to systems and methods for routing voice over internet protocol ("VoIP") calls to and from a customer owned remote switch. Embodiments of such methods may include, for example, providing a host switch in a voice over internet protocol ("VoIP") network that is communicably coupled with a plurality of remote switches and with a public switched telephone network ("PSTN"), receiving a call from the PSTN with the host switch, the call having signaling including a location routing number field, identifying a target remote switch of the plurality of remote switches that is associated with the location routing number field, and sending the call to the target remote switch based on the identification. According to some embodiments of the present invention, identifying the target remote switch of the plurality of remote switches that is associated with the location routing number field includes querying an LRN/TN database within the VoIP network to identify the target remote switch that corresponds with at least a portion of the location routing number field. In some instances of the embodiments, the signaling comprises first a calling party number field, second a location routing number field, and third the called party number field, and embodiments of the methods may further include transposing the location routing number field with the called party number field. In some cases, the target remote switch is a Class 5 softswitch.

According to various embodiments of the present invention, one or more systems is presented. Such embodiments of systems may include a computer that is communicably coupled to a computer readable medium, a VoIP network, a PSTN, and a plurality of remote switches, and wherein the computer readable medium includes instructions executable by the computer to receive a call from the PSTN, the call having signaling comprising a location routing number field, identify a target remote switch of the plurality of remote switches that is associated with the location routing number field, and send the call to the target remote switch based on the identification. According to some embodiments of the present invention, the instructions executable by the computer to identify the target remote switch of the plurality of remote switches that is associated with the location routing number field may further include instructions executable by the computer to query an LRN/TN database within the VoIP network to identify the target remote switch that corresponds with at least a portion of the location routing number field. In some instances of the embodiments, the signaling comprises first a calling party number field, second a location routing number field, and third the called party number field, and wherein the computer readable medium further includes instructions executable by the computer to transpose the location routing number field with the called party number field. In some cases, the target remote switch is a Class 5 softswitch.

One or more embodiments of the present invention are related to methods for establishing a customer-owned telephone number routing system. Such embodiments of methods include providing a host softswitch within a Voice Over Internet Protocol network, which is communicably coupled with a second network. Such embodiments of methods further include communicably coupling the host softswitch with a remote softswitch configured to connect calls to a subscriber, associating the host softswitch with the remote softswitch in a local exchange routing guide database, provisioning a location routing number/telephone number database with information associating an LRN and a block of telephone numbers with the remote softswitch, and receiving via the host softswitch a call from the second network for the subscriber. The second network may identify the host switch responsible for routing calls to the subscriber by querying the local exchange routing guide database, and the call may include signaling with a called party number and the LRN. Such embodiments of methods may further include determining the remote softswitch associated with the subscriber by querying the location routing number/telephone number database based on the location routing number, and sending the call to the remote softswitch based on the determination. In some cases, the host softswitch and/or the remote softswitch is a Class 5 softswitch, and in other cases the host switch is a Class 4 and/or a hybrid Class 4/Class 5 softswitch.

This summary provides only a general outline of some embodiments of the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

One or more embodiments of the present invention are related to systems and methods for placing media communications through a network, and more particularly to systems and methods for routing voice over internet protocol ("VoIP") calls to and from a customer owned remote switch.

Figure 5:
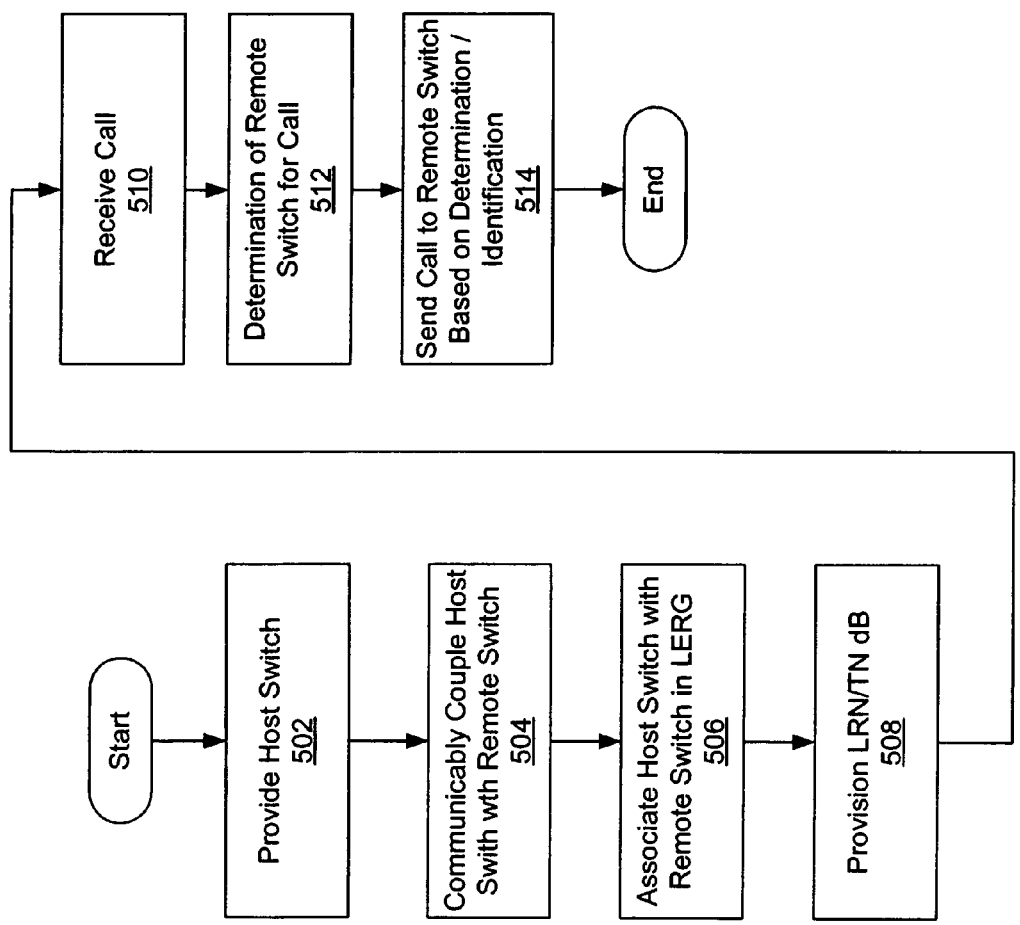
FIG. 5 depicts a flow diagram illustrating various methods according to embodiments of the present invention.

Some embodiments of the present invention provide systems and methods for routing telephone calls to a remote switch in a network. The systems and methods can be implemented using computers and computer software, such as depicted in FIG. 5, for example. Such computer software can be maintained on a computer readable medium. As used herein, the term "computer readable medium" is used in its broadest sense to mean any storage device accessible to a computer. Thus, for example, a computer readable medium can be a hard disk drive, a RAM, a floppy diskette, a CD ROM, an EEPROM, a magnetic tape, and/or the like. In some cases, the computers and/or computer software can communicate via a network. In particular, the computers can be communicably coupled to a network and/or each other. As used herein, the term "network" is used in its broadest sense to mean any system capable of passing communications from one entity to another. Thus, for example, a network can be, but is not limited to, the Internet, a virtual private network, a local area network, a wide area network, a WiFi network, a PSTN, a cellular network, and/or any combination thereof. Further, the term "communicably coupled" is used herein in its broadest sense to mean any coupling whereby information may be passed. Thus, for example, communicably coupled includes electrically coupled by, for example, a wire; optically coupled by, for example, an optical cable; and/or wirelessly coupled by, for example, a radio frequency or other transmission media. "Communicably coupled" also includes, for example, indirect coupling, such as through a network, or direct coupling.

In some cases, the aforementioned systems and methods employ routing to handle calls and/or data. As used herein, the term "routing" is used in its broadest sense to mean any action taken to transfer, initiate, terminate, end, and/or direct calls and/or data. In various instances, calls are handled by network routing resources. As used herein, the terms "network resource," "network element," or "network routing resource" are used in their broadest senses to mean any device and/or software capable of routing a call and/or data, including, but not limited to, a session border controller, a gateway, a gateway controller, a softswitch, a proxy server, or a feature server. In some embodiments, calls are routed to or from switches, such as, for example, a host switch or a remote switch. As used herein, the term "switch" refers to a network routing resource or any other device capable of performing switching functions associated with placement and/or routing of calls. According to some embodiments, calls may be placed to or from communications devices. As used herein, the term "communications device" is used in its broadest sense to mean any device capable of initiating, transmitting, and/or receiving communications through a network, and includes, but is not limited to, a telephone, a fax machine, an Internet Protocol ("IP") phone, a SIP phone, and/or a wireless phone.

Figure 1:
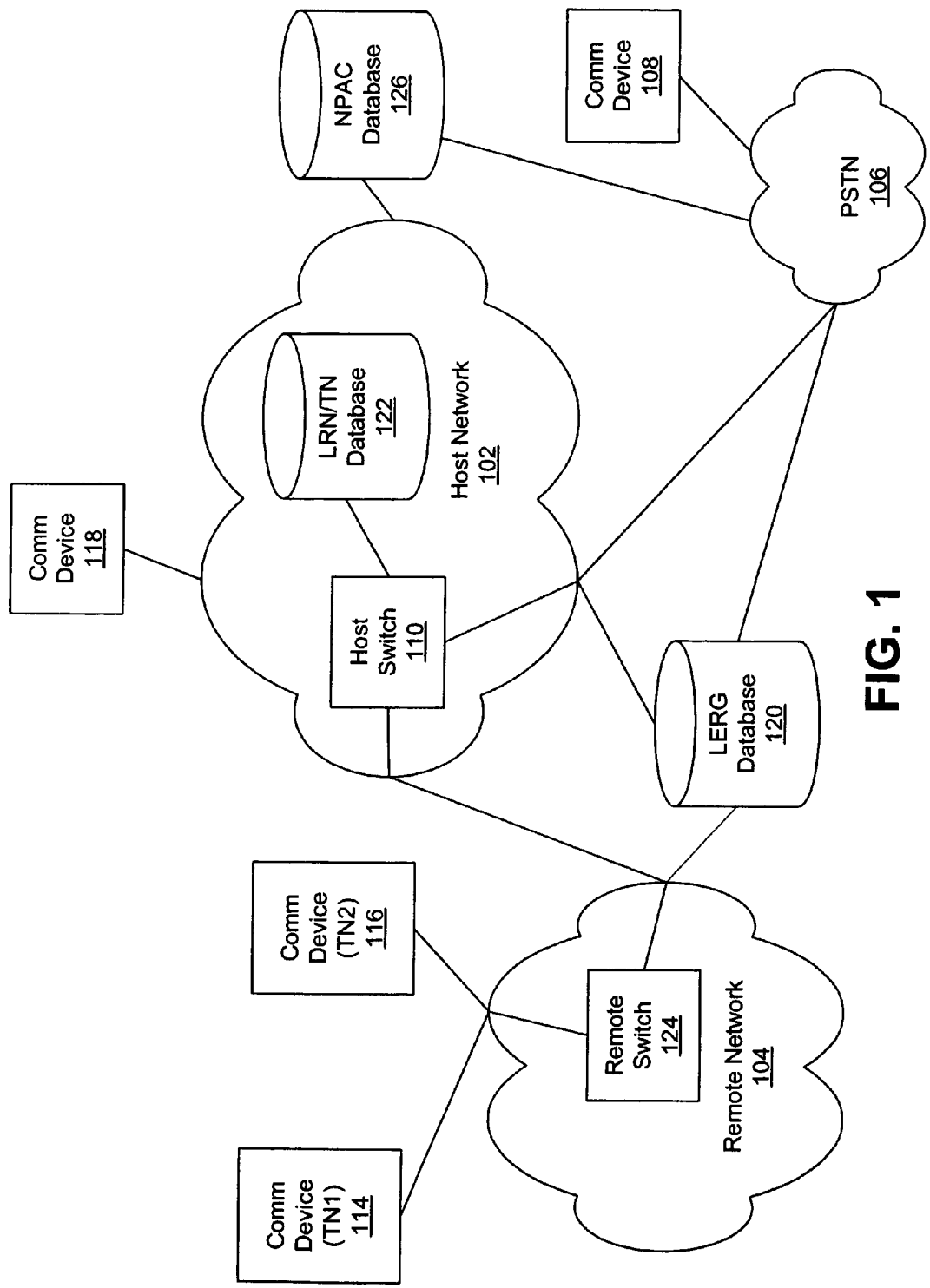
FIG. 1 illustrates a customer owned telephone number routing system in accordance with various embodiments of the present invention.

Turning to FIG. 1, a customer owned telephone number routing system 100 in accordance with various embodiments of the present invention is illustrated. Customer owned telephone number routing system 100 includes a host network 102, a remote network 104, and a public switched telephone network ("PSTN") 106. Communications device 108 is communicably coupled with PSTN 106. PSTN is communicably coupled with host network 102, and host network 102 is communicably coupled with remote network 104. Host network 102 includes a host switch 110 and a Location Routing Number ("LRN")/Telephone Number ("TN") database 122; LRN/TN database 122 may be communicably coupled with host switch 110. Host network 102 is communicably coupled with Local Exchange Routing Guide, such as, for example Telcordia® LERG™ Routing Guide, ("LERG") database 120, with Number Portability Administration Center ("NPAC") database 126, and with communications device 118. According to some embodiments of the present invention, LERG database 120 is a Telcordia® LERG™ Routing Guide, which may be produced and/or output by a Telcordia® Business Integrated Rating and Routing Database System (BIRRDS) used for inputting the code/block information.

NPAC database 126 is communicably coupled with PSTN 106, and/or host network 102. LERG database 120 may also be communicably coupled with PSTN 106 and/or remote network 104. According to some alternative embodiments of the present invention, LERG database 120 comprises data representing LERG information from another database, replicating the LERG information for internal network 102 use. According to embodiments of the present invention, LERG database 120 and/or NPAC database 126 may be replicated databases, and may be located either inside of or outside of remote network 104 and/or host network 102. Remote network 104 includes a remote switch 124, and is communicably coupled with a communications device 114 and a communications device 116.

According to some embodiments of the present invention, host network 102 is a VoIP network, and host switch 110 is a network routing resource. Embodiments of the present invention permit a customer-owned remote network 104 and customer-owned remote switch 124 to serve subscribers by connecting to PSTN 106 and/or other networks through host network 102. Such an arrangement prevents owner of remote network 104 from having to request allocation of specific TNs from owner of host network 102 for each subscriber, and facilitates the remote network 104 owner's provision of local number portability ("LNP"), emergency call completion, caller ID with name database ("CNAM") functions, line information database ("LIDB") functions, directory listings support, and other telephone number related functions. In such an arrangement, host network 102 includes a host switch 110 for the customer's remote switch 124, and the host network 102 may exchange keys with remote network 104 to perform "emergency 911" routing. Further, such an arrangement permits the remote network 104 owner, or customer, to own and maintain its own inventory of TNs, as well as all ported numbers from its subscribers, without requiring involvement of the host network 102 owner; the host network 102 owner would no longer need to gather and/or maintain subscriber-specific information for subscribers of remote network 104. Host switch 110 may be, for example, a Class 5 softswitch, a Class 4 softswitch, or a hybrid Class 4/Class 5 softswitch, which has all or some of the properties and functions of a Class 4 softswitch and/or a Class 5 soft switch.

Remote switch 124 may be, for example, a Class 5 switch. The Class 5 switch may be, for example, a Class 5 softswitch which is capable of converting a network signaling format to a media gateway and call session control format. A Class 5 softswitch can utilize the signaling to establish and teardown subscriber calls and invoke call features on existing calls, to provide various end-user services. A Class 5 softswitch may further provide for call accounting intelligence for a host network. A Class 4 softswitch, on the other hand, may in some embodiments perform higher-level switching and routing tasks while not necessarily performing the same call features that a Class 5 softswitch performs, such as, for example, caller ID. Class 4 softswitches are often situated closer to the center of the network and configured to handle VoIP calls in a fashion similar to that of tandem office switches in circuit-switched networks. A hybrid Class 4/Class 5 softswitch has some or all of the properties and functions of a Class 4 softswitch and/or a Class 5 softswitch, according to embodiments of the present invention.

Remote switch 124 serves one or more communications devices 114, 116. Communications device 114 may be associated with a first telephone number (TN1), and communications device 116 may be associated with a second telephone number (TN2), for example. When a call is made from an outside communications device, such as communications device 108 and/or communications device 118, to a telephone number associated with a subscriber of remote network 104, such as, for example, to the telephone number (TN1) associated with communications device 114, the call passes through host switch 110 of host network 102 before passing to remote network 104.

Figure 2:
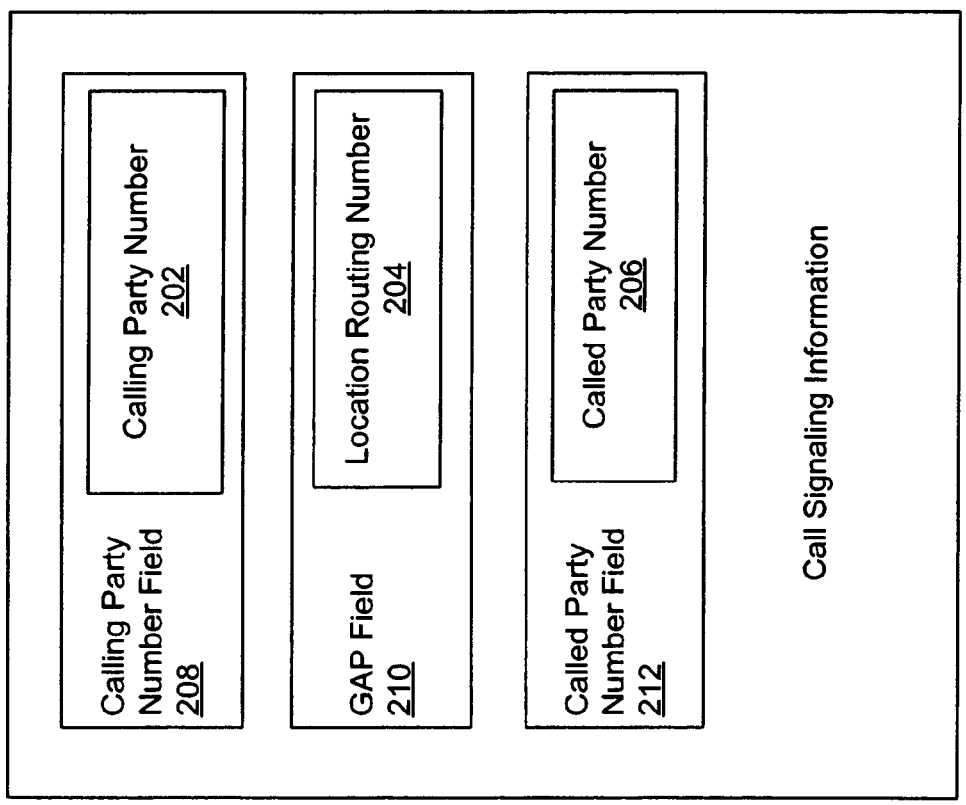
FIG. 2 illustrates exemplary call signaling information according to embodiments of the present invention.

FIG. 2 illustrates exemplary signaling information 200 according to embodiments of the present invention. This signaling information 200 may be communicated between network signaling elements in a communication network via different methods, such as, for example, SS7, PRI, CAS, and SIP. SIP signaling is a unique VoIP signaling protocol and may be particularly useful for signaling by network 102. Although call signaling information 200 may often comprise more information than shown in FIG. 2, a first field, the calling party number field 206, may be populated by the calling party number 202; a second field, the GAP field 210, may be populated by the location routing number 204; and a third field, the called party number field 212 may be populated by the called party number 206. Fields 202, 204, 206 and their respective contents aide a receiving device, such as host switch 110, in routing the call to the proper destination, or target, remote switch 124.

Figure 3:
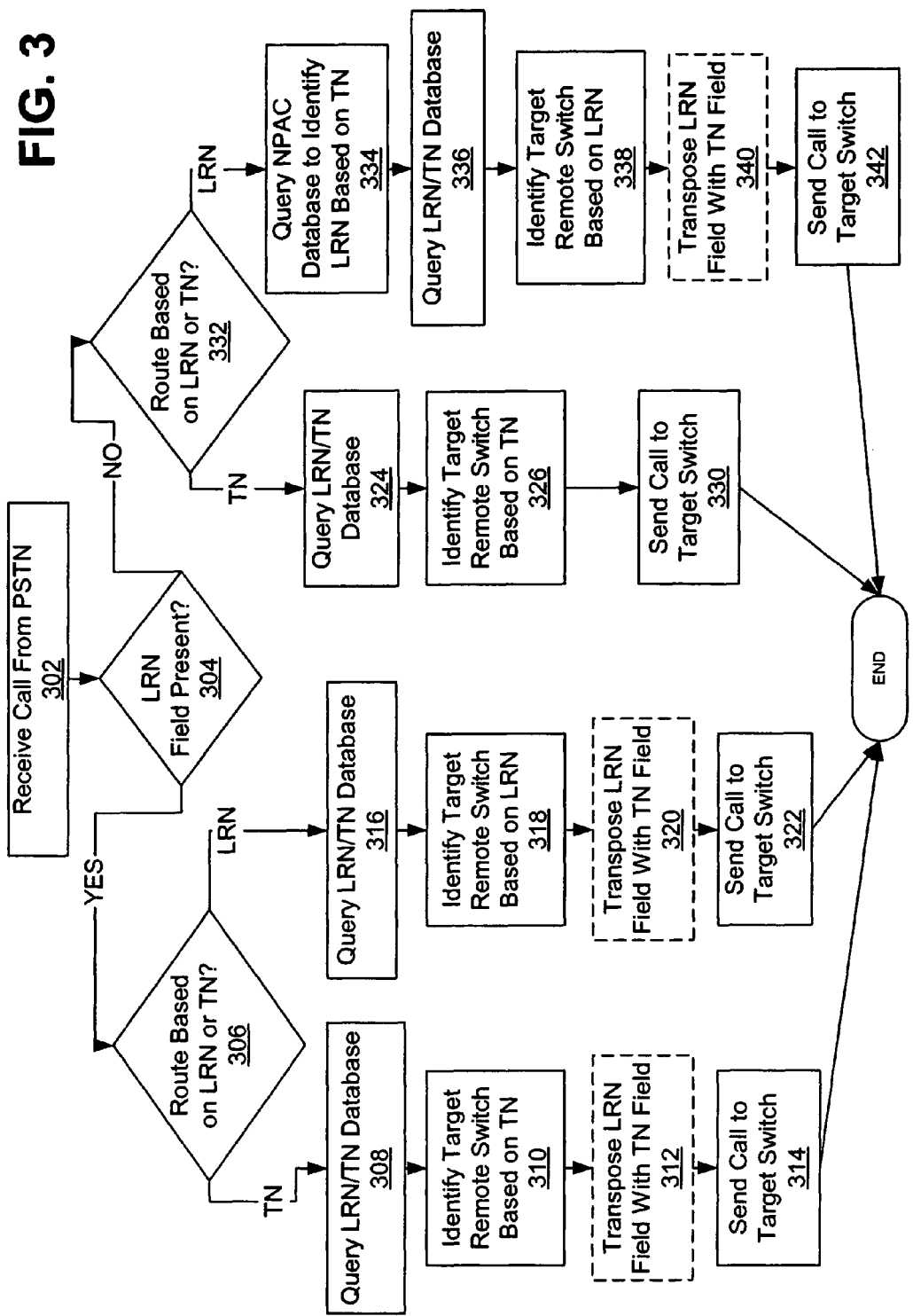
FIG. 3 depicts a flow diagram illustrating methods for routing calls to customer owned telephone numbers, according to various embodiments of the present invention.

FIG. 3 depicts a flow diagram 300 illustrating methods for routing calls from a host switch to customer owned telephone numbers, according to various embodiments of the present invention. A call is received from PSTN 106 (block 302) at host switch 110 of host network 102. A determination is then made whether the LRN field is present (block 304). If the LRN field 204 is present, then a determination is made whether to route the call based on the LRN field 204 or the TN field, also known as the called party number field, 206 (block 306). If routing to a remote switch 124 is to be based on the TN field, then host switch 110 queries the LRN/TN database 122 to find a target remote switch 124 associated with the TN field 206 of the call (block 310). The target remote switch 124 may be identified based on the TN (block 310) by, for example, matching the TN with a corresponding entry in the LRN/TN database 122, and then reading the remote switch 124 identification associated with the particular TN entry in the LRN/TN database 122. Remote switch 124 may be identified, for example, by its COMMON LANGUAGE® Location Code ("CLLI™ Code"), or by another unique identifier of a device on networks 102 and/or 104.

Once remote switch 124 has been identified, host switch 110 may optionally transpose the LRN 204 with the called party number 206 (block 312). Such transposition of LRN 204 with TN 206 may permit the call to be routed to remote switch 124 in a format resembling a call made directly to remote switch 124 from PSTN 106, if such connected existed. For example, some softswitches such as remote switch 124 may be configured to process calls in which the call signaling information 200 lists the called party number 206 in the GAP field 210. In such cases, host switch 110 may be configured to transpose the LRN 204 from the GAP field 210 into the called party number field 212 in order to provide the call to remote switch 124 in a format that facilitates routing. According to some embodiments of the present invention, transposing LRN 204 with TN 206 involves transposing the processing logic used by host network 102 and/or host switch 110 to process the call signaling, instead of actually transposing the LRN 204 with the TN 206 between GAP field 210 and called party number field 212 within call signaling information 200. Once the target remote switch 124 has been identified, the call is sent to the target remote switch 124 (block 314). The remote switch 124 then uses the called party number field 206 to route the call to the correct subscriber associated with the called party number field 206.

In cases where the LRN is present (block 304) and the call is to be routed based on the LRN (block 306), then host switch 110 queries the LRN/TN database 122 to find a target remote switch 124 associated with the LRN field 204 of the call (block 316). The target remote switch 124 may be identified based on the LRN (block 318) by, for example, matching the LRN with a corresponding entry in the LRN/TN database 122, and then reading the remote switch 124 identification associated with the particular LRN entry in the LRN/TN database 122. Remote switch 124 may be identified, for example, by the IP address used to direct signaling to and from the switch. The remote switch 124 may be identified, for example, by its COMMON LANGUAGE® Location Code ("CLLI™ Code") along with some other key, or by another unique identifier of a device on networks 102 and/or 104.

Once remote switch 124 has been identified, host switch 110 may optionally transpose the LRN 204 with the called party number 206 (block 320). Such transposition of LRN field 204 with TN field 206 may permit the call to be routed to remote switch 124 in a format resembling a call made directly to remote switch 124 from PSTN 106, if such connected existed. For example, some softswitches such as remote switch 124 may be configured to process calls in which the call signaling information 200 lists the called party number 206 in the GAP field 210. In such cases, host switch 110 may be configured to transpose the LRN 204 from the GAP field 210 into the called party number field in order to provide the call to remote switch 124 in a format that facilitates routing. Once the target remote switch 124 has been identified, the call is sent to the target remote switch 124 (block 322). The remote switch 124 then uses the called party number field 206 to route the call to the correct subscriber associated with the called party number field 206.

In cases where the LRN is not present (block 304), a determination is made whether to route the call based on the LRN field 204 or the TN field 206 (block 332). In cases where the call is to be routed based on the TN, then host switch 110 queries the LRN/TN database 122 to find a target remote switch 124 associated with the TN field 206 of the call (block 324). The target remote switch 124 may be identified based on the LRN (block 326) by, for example, matching the LRN with a corresponding entry in the LRN/TN database 122, and then reading the remote switch 124 identification associated with the particular LRN entry in the LRN/TN database 122. Remote switch 124 may be identified, for example, by its COMMON LANGUAGE® Location Code ("CLLI™ Code"), or by another unique identifier of a device on networks 102 and/or 104. Once remote switch 124 has been identified, the call is sent to the target remote switch 124 (block 330). The remote switch 124 then uses the called party number 206 to route the call to the correct subscriber associated with the called party number field 206.

In cases where the LRN is not present (block 304) and the call is to be routed based on the LRN (block 332), then host switch 110 queries the Number Portability Administration Center ("NPAC") database 126 to identify the LRN field 204 based on the TN field 206 (block 334). Calls may be received by host switch 110 without a LRN field 204 if there were, for example, an error made by PSTN 106 in routing the call. Once the LRN is obtained, host switch 110 then queries LRN/TN database 122 to find a target remote switch 124 associated with LRN field 204 of the call (block 336). The target remote switch 124 may be identified based on the LRN (block 338) by, for example, matching the LRN with a corresponding entry in the LRN/TN database 122, and then reading the remote switch 124 identification associated with the particular LRN entry in the LRN/TN database 122. Remote switch 124 may be identified, for example, by its COMMON LANGUAGE® Location Code ("CLLI$^{SM}$ Code"), or by another unique identifier of a device on networks 102 and/or 104.

Once remote switch 124 has been identified, host switch 110 may optionally transpose the LRN 204 with the called party number 206 (block 340). Such transposition of LRN field 204 with TN field 206 may permit the call to be routed to remote switch 124 in a format resembling a call made directly to remote switch 124 from PSTN 106, if such connected existed. For example, some softswitches such as remote switch 124 may be configured to process calls in which the call signaling information 200 lists the called party number 206 in the GAP field 210. In such cases, host switch 110 may be configured to transpose the LRN 204 from the GAP field 210 into the called party number field in order to provide the call to remote switch 124 in a format that facilitates routing. Once the target remote switch 124 has been identified, the call is sent to the target remote switch 124 (block 342). The remote switch 124 then uses the called party number 206 to route the call to the correct subscriber associated with the called party number field 206.

According to embodiments of the present invention, when a customer is set up according to the system 100 illustrated in FIG. 1, for example, the customer begins by acquiring a VoIP switch that may serve as remote switch 124, such as a Class 5 switch. Next, the customer establishes remote switch 124 CLLIs™, and acquires telephone numbers from entities such as North American Numbering Plan Administration ("NANPA") for a ten thousand block of TNs, and/or from entities such as Neustar for a one thousand block. The customer also establishes LRNs for its subscribers, acquires competitive local exchange carrier ("CLEC") status, and provides its Operating Company Number ("OCN") to owner of host network 102. The host network 102 then opens LERG database 120 access to allow the customer to provision against the host network's 102 CLLI™ for host switch 110 and/or other host switches such as, for example, by adding the customer's OCN as authorized to update LERG database 120 for the host network 102 owner's switches. LERG database 120 may be, for example, Telcordia® LERG™ Routing Guide, according to embodiments of the present invention.

Next, the customer provisions LERG database 120 with information associating a host switch 110 of host network 102 and a remote switch 124 of remote network 104 with each NPA-NXX-X identifier in LERG database 120. Finally, the owner of host network 102 closes LERG database 120 access and provisions its own network 102 with customer-owned TN and LRNs. For example, the owner of host network 102 provisions its network 102 with customer-owned TNs and LRNs by entering information associating a particular LRN, a particular TN, a particular portion of a particular LRN or group of LRNs, and/or a particular portion of a particular TN or group of TNs (such as the NPA-NXX-XXX identifier) with a particular remote switch 124, or with a particular CLLI™ identifying remote switch 124. Such provisioning information relating customer-owned switches 124 with TN and LRN information may be entered into a database, such as, for example, LRN/TN database 122. Such provisioning information within LRN/TN database 122 may be continuously updated and/or updated upon addition of LRNs or new blocks of TNs by customer/owner of remote switch 124.

According to some embodiments of the present invention, a customer obtains a block of TNs and allocates the TNs to its subscribers. Because the owner of host network 102 would be provided with information about the block of telephone numbers (such as NPA-NXX-XXXX identifiers) during the customer's setup process, when host switch 110 receives calls to such numbers, host switch 110 may either route the call based on the LRN field 204 and/or the TN field 206, because such information will have been provisioned into LRN/TN database 122, to permit host switch 110 to identify a remote switch 124 based on such information. However, for subscribers of the customer (i.e. remote network 104 subscribers) who wished to keep their previous TN, host switch 110 would use LRN field 204 to identify remote switch 124 for incoming calls. According to some embodiments of the present invention, TN field 206 is present in the signaling information 200 and the presence of the LRN field 204 is based on the status of the TN field 206. If remote switch 124 with which the TN field 206 is associated is not able to be identified at the six-digit level, the LRN field 204 may be populated prior to arrival of the call signaling with host network 102 and/or host switch 110. For example, the LRN field 204 may be populated by PSTN 106 based on the TN field 206.

Figure 4:
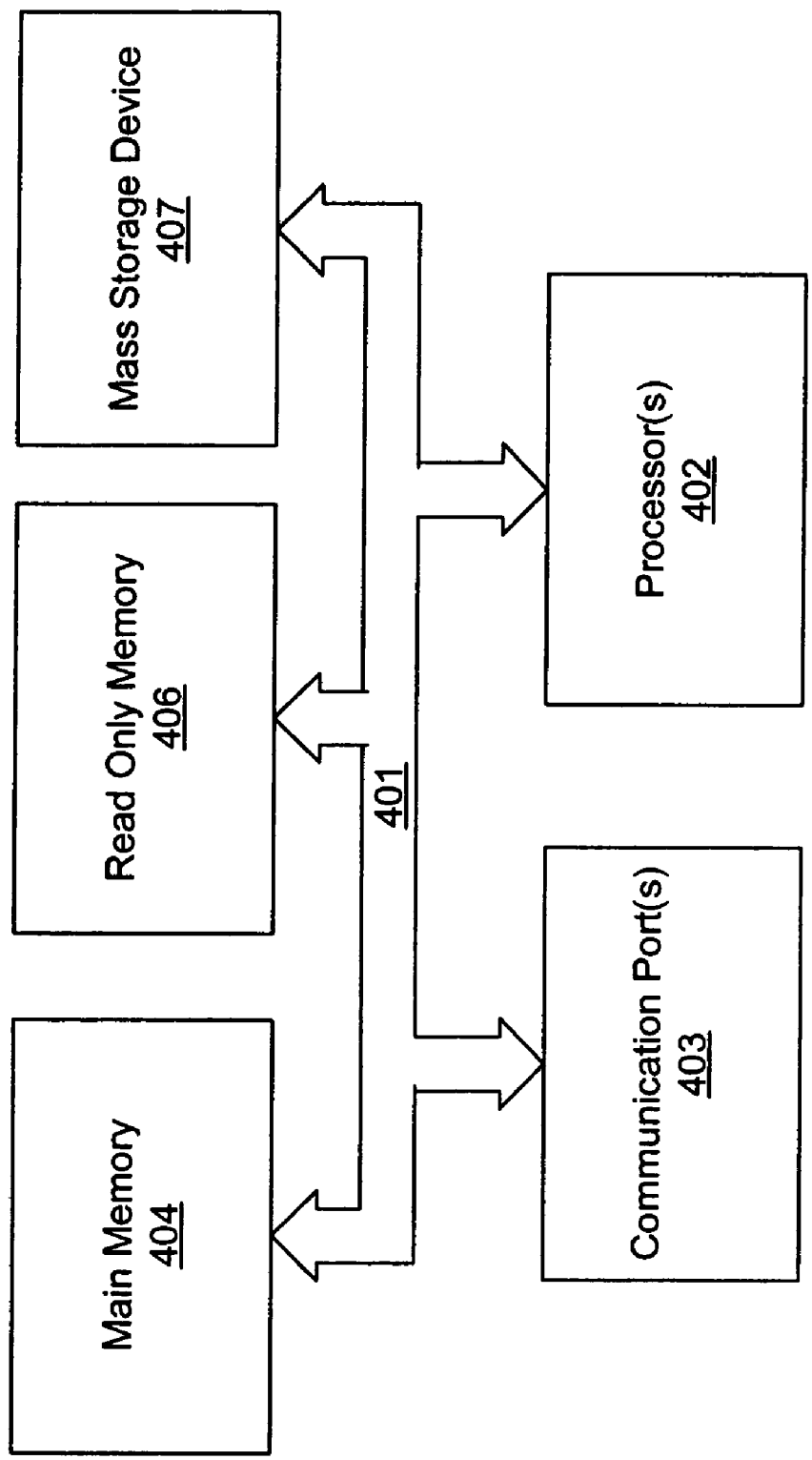
FIG. 4 is an example of a computer system with which embodiments of the present invention may be utilized.

FIG. 4 is an example of a computer system 400 with which embodiments of the present invention may be utilized. Computer system 400 represents an exemplary host switch 110 and/or remote switch 124 which may implement one or more of the methods discussed herein for routing calls in a customer-owned telephone number network. In this simplified example, the computer system 400 comprises a bus 401 or other communication means for communicating data and control information, and one or more processing devices 402, such as a well known processor, Application Specific Integrated Circuit (ASIC), a field programmable gate array (FPGA), or the like, coupled with bus 401.

In this simplified embodiment, computer system 400 further comprises a random access memory (RAM) or other dynamic storage device (referred to as main memory 404), coupled to bus 401 for storing information and instructions to be executed by processing device 402. Main memory 404 also may be used for storing temporary variables or other intermediate information during execution of instructions by processor(s) 402.

Computer system 400 can also include a read only memory (ROM) 406 and/or other static storage device coupled to bus 401 for storing static information and instructions for processing device 402. A mass storage device 407, such as a magnetic disk or optical disc and its corresponding drive, may also be coupled to bus 401 for storing instructions and information, such as configuration files, a key store and registration database, etc. Such ROM 406 may comprise, for example, one or more databases in which information may be stored and/or retrieved, such as, for example, information received or sent via system 100, SAP 104, or the modules of FIG. 2.

One or more communication ports 403 may also be coupled to bus 401 for supporting network connections and communication of information to/from the computer system 400 by way of a communication network, such as a Local Area Network (LAN), Wide Area Network (WAN), or the Internet, for example. The communication ports 403 may include various combinations of well-known interfaces, such as one or more modems to provide network access, one or more 10/100 Ethernet ports, one or more Gigabit Ethernet ports (fiber and/or copper), or other well-known network interfaces commonly used in internet work environments. In any event, in this manner, the computer system 400 may be coupled to a number of other network devices, communication devices, clients, NTMs, and/or servers via a conventional communication network infrastructure.

Optionally, operator and administrative interfaces (not shown), such as a display, keyboard, and a cursor control device, may also be coupled to bus 401 to support direct operator interaction with computer system 400. Other operator and administrative interfaces can be provided through network connections connected through communication ports 403.

Finally, removable storage media (not shown), such as one or more external or removable hard drives, tapes, floppy disks, magneto-optical discs, compact disk-read-only memories (CD-ROMs), compact disk writable memories (CD-R, CD-RW), digital versatile discs or digital video discs (DVDs) (e.g., DVD-ROMs and DVD+RW), Zip disks, or USB memory devices, e.g., thumb drives or flash cards, may be coupled to bus 401 via corresponding drives, ports or slots.

FIG. 5 depicts a flow diagram 500 illustrating various methods according to embodiments of the present invention. A host softswitch 110 may be provided within a Voice Over Internet Protocol network 102, and communicably coupled with a second network (block 502). The second network may be, for example, PSTN 106. The host softswitch 110 may be communicably coupled with a remote softswitch 124 configured to connect calls to a subscriber (block 504), such as, for example, to subscriber's communication device 114, 116. The host softswitch 110 may then be associated with the remote softswitch 124 in a LERG database 120 (block 506). Next, an LRN/TN database 122 may be provisioned with information associating an LRN and a block of telephone numbers with the remote softswitch 124 (block 508). In operation, a call may be received via the host softswitch 110 from the second network 106 for the subscriber (block 510). In such cases, the second network, such as, for example, a PSTN 106 operator, may identify the host switch 110 responsible for routing calls to the subscriber by querying LERG database 120. The received call may include signaling 200 exhibiting a called party number 206 and/or an LRN 204.

Based on LRN 204, host softswitch 110 may determine which remote softswitch 124 is associated with the subscriber by querying the LRN/TN database 122 based on the LRN 204 (block 512). Alternatively, host softswitch 110 may determine which remote softswitch 124 is associated with the subscriber by querying the LRN/TN database 122 based on the TN 206. According to some embodiments of the present invention, LRN/TN database 122 may contain a record indicating that all calls for which the called party number 206 falls within a certain ten-thousand block of TNs, for example, within the ten-thousand block "123-456-XXXX," should be routed to a particular remote softswitch 124. According to other alternative embodiments of the present invention, LRN/TN database 122 may contain a record indicating that all calls for which the LRN 204 matches a certain number or falls within a certain range of LRNs, should be routed to a particular remote softswitch 124. Once the remote softswitch 124 has been identified in one such fashion, the call may be sent to the remote softswitch 124 based on the determination (block 514).

Embodiments of the invention have now been described in detail for purposes of clarity and understanding. However, it will be appreciated that certain changes and modifications may be practiced within the scope of the appended claims. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method of routing a call toward a destination communications device, the method comprising:
   providing a host switch in a voice over internet protocol (VoIP) network communicably coupled with a plurality of remote switches and with a public switched telephone network (PSTN), wherein each of the remote switches is located on one or more remote networks distinct from the VoIP network and the PSTN;
   receiving a call from the PSTN with the host switch, the call having signaling comprising a location routing number field, wherein the location routing number field comprises a location routing number;
   identifying, by the host switch, a target remote switch of the plurality of remote switches that is associated with the location routing number, wherein identifying the target remote switch of the plurality of remote switches that is associated with the location routing number comprises querying a location routing number (LRN)/telephone number (TN) database within the VoIP network to identify the target remote switch that corresponds with at least a portion of the location routing number; and
   sending the call to the target remote switch based on the identification such that the call is transmitted to the destination communications device at least in part over one of the remote networks.

2. The method of claim 1, wherein the signaling comprises a calling party number field and a called party number field, and wherein the method further comprises:
   transposing the location routing number field with the called party number field.

3. The method of claim 1, wherein the target remote switch is a Class 5 softswitch.

4. A system comprising:
   a computer, wherein the computer is communicably coupled to a computer readable medium within a voice over internet protocol (VoIP) network, wherein the computer is further communicably coupled to a public switched telephone network (PSTN), and a plurality of remote switches, each of the plurality of remote switches being located on one or more remote networks distinct from the VoIP network and the PSTN, and wherein the computer readable medium includes instructions executable by the computer to:

receive a call from the PSTN, the call having signaling comprising a location routing number field, wherein the location routing number field comprises a location routing number;

identify a target remote switch of the plurality of remote switches that is associated with the location routing number, wherein the instructions executable by the computer to identify the target remote switch of the plurality of remote switches that is associated with the location routing number further comprise instructions executable by the computer to query an LRN/TN database within the VoIP network to identify the target remote switch that corresponds with at least a portion of the location routing number; and send the call to the target remote switch based on the identification such that the call is transmitted at least in part over one of the remote networks.

5. The system of claim 4, wherein the signaling further comprises a calling party number field and a called party number field, and wherein the computer readable medium further includes instructions executable by the computer to:

transpose the location routing number field with the called party number field.

6. The system of claim 4, wherein the target remote switch is a Class 5 softswitch.

7. A method for establishing a customer-owned telephone number routing system, the method comprising:

providing a host softswitch within a Voice Over Internet Protocol (VoIP) network, the host softswitch communicably coupled with a second network;

communicably coupling the host softswitch with a remote softswitch configured to connect calls to a subscriber, wherein the remote softswitch is located on a remote network distinct from the VoIP network and the second network;

associating the host softswitch with the remote softswitch in a local exchange routing guide (LERG) database;

provisioning a location routing number (LRN)/telephone number (TN) database within the VoIP network with information associating a location routing number (LRN) and a block of telephone numbers with the remote softswitch;

receiving via the host softswitch a call from the second network for the subscriber, the second network identifying the host softswitch responsible for routing calls to the subscriber by querying the LERG database, wherein the call received via the host softswitch comprises signaling, the signaling comprising a called party number and the LRN;

determining, by the host softswitch, that the remote softswitch is associated with the subscriber by querying the LRN/TN database based on the received LRN; and sending the call to the remote softswitch based on the determination.

8. The method of claim 7, wherein the host softswitch is a Class 5 softswitch.

9. The method of claim 7, wherein the host softswitch is a Class 4 softswitch.

10. The method of claim 7, wherein the host softswitch is a hybrid Class 4/Class 5 softswitch.

11. The method of claim 7, wherein the remote softswitch is a Class 5 softswitch.

12. The method of claim 1, wherein the host switch is a Class 5 softswitch.

13. The method of claim 1, wherein the host switch is a Class 4 softswitch.

14. The method of claim 1, wherein the host switch is a hybrid Class 4/Class 5 softswitch.

15. The system of claim 4, wherein the computer is a Class 5 softswitch.

16. The system of claim 4, wherein the computer is a Class 4 softswitch.

17. The system of claim 4, wherein the computer is a hybrid Class 4/Class 5 softswitch.

* * * * *